US009946354B2

(12) United States Patent
Livshits et al.

(10) Patent No.: US 9,946,354 B2
(45) Date of Patent: Apr. 17, 2018

(54) GESTURE PROCESSING USING A DOMAIN-SPECIFIC GESTURE LANGUAGE

(71) Applicant: Microsoft Corporation, Redmond, WA (US)

(72) Inventors: Benjamin Livshits, Kirkland, WA (US); Margus Veanes, Bellevue, WA (US); Loris D'Antoni, Philadelphia, PA (US); Lucas S. Figueiredo, Recife (BR); David A. Molnar, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 14/472,942

(22) Filed: Aug. 29, 2014

(65) Prior Publication Data

US 2016/0062468 A1 Mar. 3, 2016

(51) Int. Cl.
*G06F 3/048* (2013.01)
*G06F 3/01* (2006.01)

(52) U.S. Cl.
CPC .............. *G06F 3/017* (2013.01); *G06F 3/011* (2013.01)

(58) Field of Classification Search
CPC .......... G06F 3/011; G06F 3/017; G06F 3/012; G06F 3/013; G06F 3/014; G06F 17/2785–17/3087; G06F 3/016; G06N 3/08; G06N 5/02; G06N 5/022; G06N 99/005

See application file for complete search history.

(56) References Cited

U.S. PATENT DOCUMENTS

| 8,639,020 | B1 | 1/2014 | Kutliroff et al. | |
|---|---|---|---|---|
| 2010/0013944 | A1* | 1/2010 | Venetsky | G06K 9/00355 348/222.1 |
| 2010/0277489 | A1 | 11/2010 | Geisner et al. | |
| 2012/0133579 | A1* | 5/2012 | Prieur | G06F 3/017 345/156 |
| 2013/0339908 | A1* | 12/2013 | Bailey | G06F 3/017 715/863 |
| 2014/0046922 | A1 | 2/2014 | Crook et al. | |

(Continued)

FOREIGN PATENT DOCUMENTS

EP 2273345 A2 12/2011

OTHER PUBLICATIONS

Khandkar, S. H., Maurer, F., "A Domain Specific Language to Define Gestures for Multi-Touch Applications", in "Proceedings of the 10th Workshop on Domain-Specific Modeling", Article No. 2, Oct. 17, 2010, 6 pages.*

(Continued)

*Primary Examiner* — Claudia Dragoescu
(74) *Attorney, Agent, or Firm* — International IP Law Group, PLLC

(57) ABSTRACT

The claimed subject matter includes techniques for processing gestures. An example method includes receiving a gesture from an application. The gesture includes one or more primitives from a language that is domain-specific to gestures. The method also further includes receiving skeletal data from a motion detection system. The method also includes comparing the skeletal data with the gesture from the application in a runtime module. The method also further includes sending a gesture event to the application.

23 Claims, 7 Drawing Sheets

(56) References Cited

U.S. PATENT DOCUMENTS

| | | | |
|---|---|---|---|
| 2014/0059512 A1* | 2/2014 | Brown | G06F 8/00 717/100 |
| 2014/0140590 A1 | 5/2014 | Wilson et al. | |
| 2014/0198954 A1 | 7/2014 | Bulzacki | |
| 2014/0201666 A1* | 7/2014 | Bedikian | G06F 3/017 715/771 |
| 2015/0234467 A1* | 8/2015 | Tachibana | G06F 3/017 715/863 |

OTHER PUBLICATIONS

International Search Report for PCT Application No. PCT/US2015/047067, dated Nov. 2, 2015, 11 pages.
Written Opinion of the International Preliminary Examining Authority, for PCT application PCT/US2015/047067, dated Jul. 5, 2016, (9 pages).
Ansell, et al., "SlideShow Gestures-WPF", Published on: Sep. 20, 2012, Available at: http://research.microsoft.com/en-us/projects/slideshowgestureswpf/, 2 pages.
Blanchard, et al., "Kinect Google Earth Interface", Published on: Feb. 7, 2011, Available at: https://docs.google.com/document/preview?hgd=1&id=1XIEXmDmk-a29mhWtso2WuvKU0jKRTY-bDHwETWHIZ2U&pli=1, 19 pages.
Dapkus, Mykolas, "Natural Gesture Recognition using the Microsoft Kinect System", published on: Dec. 15, 2011, Available at: http://people.cs.pitt.edu/~chang/231/y11/proj11/finalmyko.pdf, pp. 1-7.
Davaasambuu, et al., "A Microsoft Kinect based Virtual Rehabilitation System", In Proceedings of 5th Conference on Frontiers of Information Technology, Applications and Tools, Aug. 8, 2012, pp. 44-50.
Hoste, et al., "Criteria, Challenges and Opportunities for Gesture Programming Languages", In Proceedings of 1st International Workshop on Engineering Gestures for Multimodal Interfaces, Jun. 17, 2014, 8 pages, Rome, Italy.
Khandkar, et al., "A Domain Specific Language to Define Gestures for Multi-Touch Applications", In Proceedings of 10th Workshop on Domain-Specific Modeling, Article No. 2, Oct. 17, 2010, 6 pages.
Su, Chuan-Jun, "Personal Rehabilitation Exercise Assistant with Kinect and Dynamic Time Warping", In Proceedings of International Journal of Information and Education Technology, vol. 3, No. 4, Aug. 2013, pp. 448-454.
"International Preliminary Report on Patentability Issued in PCT Application No. PCT/US2015/047067", dated Nov. 15, 2016, 10 Pages.

* cited by examiner

100

GESTURE PROCESSING USING A DOMAIN-SPECIFIC GESTURE LANGUAGE

BACKGROUND

Motion detection systems provide skeletal data and other spatial data to software applications providing interactive user experience. For example, a motion detection system may provide data such as the position, joints, movement, among other data about an environment in which the gesture recognition system is located. Based on this information, an application may allow a user to interact using movement and/or positions of the body, such as the limbs, head, hands, feet, face, etc. For example, a motion detection system may detect a hand movement and send the hand movement data to an application. The application may then process the hand movement data to cause a virtual object to move on a screen or navigate a menu.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a system for static analysis of gestures. The system can include first module configured to receive a plurality of gestures and translate each of the gestures into an intermediate representation. Each gesture can include one or more primitives from a language domain-specific to gestures. The system can also include a second module configured to statically analyze the intermediate representation for a condition.

Another implementation provides a method for processing gestures. The method can include receiving a gesture from an application, the gesture comprising one or more primitives from a language that is domain-specific to gestures. The method also can include receiving skeletal data from a motion detection system. The method can include comparing the skeletal data with the gesture from the application in a runtime module. The method can further include sending a gesture event to the application.

Another implementation provides one or more computer-readable memory storage devices for processing gestures. The one or more computer-readable memory storage devices can include instructions, that, when executed by a processor, can cause the processor to receive a gesture from an application. The gesture can include one or more primitives from a language that is domain-specific to gestures. When executed, the computer-readable instructions can cause the processor to receive a gesture library. The gesture library can include primitives from the language that is domain-specific to gestures. When executed, the computer-readable instructions can also cause the processor to receive skeletal data from a motion detection system. When executed, the computer-readable instructions can also cause the processor to compare the skeletal data with the gesture from the application in a runtime module using the gesture library. When executed, the computer-readable instructions can also further cause the processor to send a result to the application.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 6:
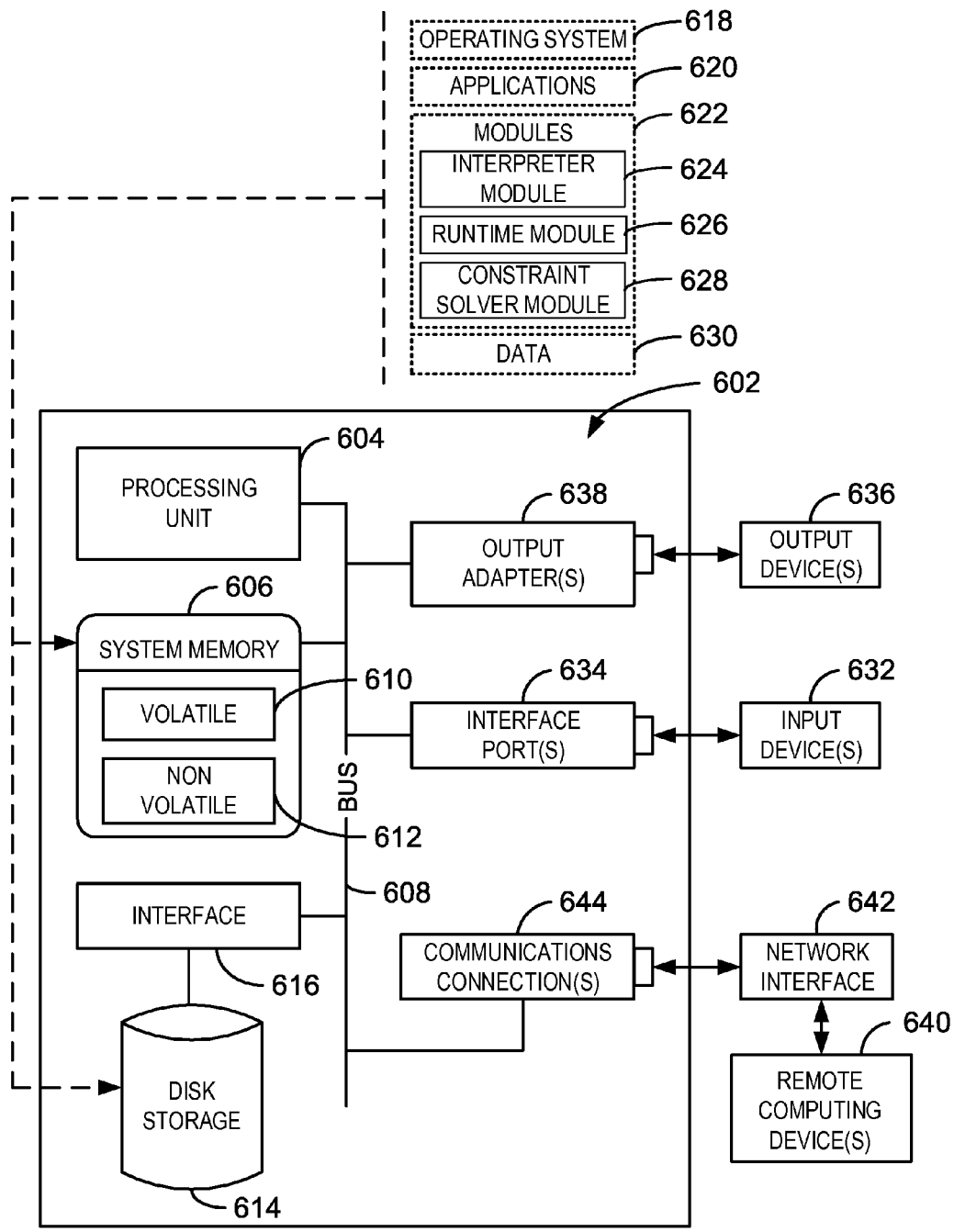
FIG. 6 is a block diagram of an exemplary computing device configured for implementing various aspects of the techniques described herein.

As a preliminary matter, some of the figures describe concepts in the context of one or more structural components, variously referred to as functionality, modules, features, elements, or the like. The various components shown in the figures may be implemented in any manner, such as software, hardware, firmware, or combinations thereof. In some implementations, various components reflect the use of corresponding components in an actual implementation. In other implementations, any single component illustrated in the figures may be implemented by a number of actual components. The depiction of any two or more separate components in the figures may reflect different functions performed by a single actual component. FIG. 6, discussed below, provides details regarding one computing device that may be used to implement the functions shown in the figures.

Other figures describe the concepts in flowchart form. In this form, certain operations are described as constituting distinct blocks performed in a certain order. Such implementations are exemplary and non-limiting. Certain blocks described herein may be grouped together and performed in a single operation, certain blocks may be broken apart into multiple component blocks, and certain blocks may be performed in an order that differs from that which is illustrated herein, including a parallel manner of performing the blocks. The blocks shown in the flowcharts may be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality may be constructed to perform an identified operation. The functionality may be configured to perform an operation using, for instance, software, hardware, firmware, or the like. The term, "logic" encompasses any functionality for performing a task. For instance, each operation illustrated in the flowcharts corresponds to logic for performing that operation. An operation may be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media or devices may include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media or devices, may include communication media such as transmission media for wireless signals and the like.

The following describes example implementations of techniques for testing and processing gestures for applications written in a programming vocabulary that is domain-specific to gestures. A gesture, as used herein, refers to a programming object that includes one or more poses and an execution block. A pose refers to a set of conditions that occur simultaneously. The conditions may be described by the primitives of a programming language. For example, primitives can include verbs such as "point" or "put," skeletal segments such as "left hand" or "right hand," directions such as "your left" or "your right," and magnitudes of movement such as "20 degrees" or "10 degrees." A domain-specific programming language may be used to write the gestures including primitives such as movements, skeletal segments, and positions, among other kinds of data. An execution block refers to a specified ordering of poses that results in a gesture being detected. The different kinds of primitives may be stored in a gesture library that may also be used by an interpreter module to translate gestures into an intermediate representation for analyzing. An intermediate representation, as used herein, refers to a form a gesture that is easy to analyze. For example, the intermediate representation may include constraints. In some examples, a gesture library can be modified by any suitable machine learning technique or user by adding or changing primitives and/or gestures. The use of customizable primitives in a language domain-specific to gestures allows new gestures to be encoded and existing gestures to be modified.

To analyze a gesture, according to techniques described herein, a gesture processing system may translate the application gestures along with system-reserved gestures into intermediate forms called constraints. A constraint solver module may analyze the constraints for conflicts. A conflict, as used herein, refers to two or more gestures that may be triggered by similar movements and/or positions. Additionally, the constraint solver module may analyze gestures with respect to given safety constraints. Safety constraints are a subset of possible movements and positions expressed as logical statements that are considered dangerous to a user or otherwise undesirable for use as a gesture. In some embodiments, the constraint solver module may perform the analysis statically. A static analysis, as used here, refers to an analysis that may be performed before an application is executed by a user or uploaded to an application store. Static analysis, or analyzing statically, may also be referred to as upload time checking or just-in-time checking. Implementations of the present techniques provide static gesture analysis that may be used with a gesture-based application and may be implemented, for example, with a gaming system or on a computer, among other devices. The system described herein enables the static analysis of gesture-based applications. Static analysis may include testing for conflicts between two or more gestures, conflicts between an application gesture and a system-served gesture, and conflicts with safety constraints, among others. Such static analysis ensures user safety by preventing unsafe gestures from being requested of users, as well as ensuring functionality of the motion detection system and application.

The system described herein also enables gesture recognition from skeletal data. Skeletal data may include data from a motion detecting system corresponding to joints of the body, limbs, hands, as well as facial features, among other data such as movement and relative position. According to techniques described herein, skeletal data may be used to detect gestures. For example, a gesture processing system may receive skeletal data from a motion detection system and gestures from an application and match the skeletal data with one or more gestures. The detected gestures may be sent to one or more applications without any sharing of the skeletal data with the applications. The privacy of users providing the skeletal data may be safeguarded by a trust boundary between the gesture processing system and the applications.

Figure 1:
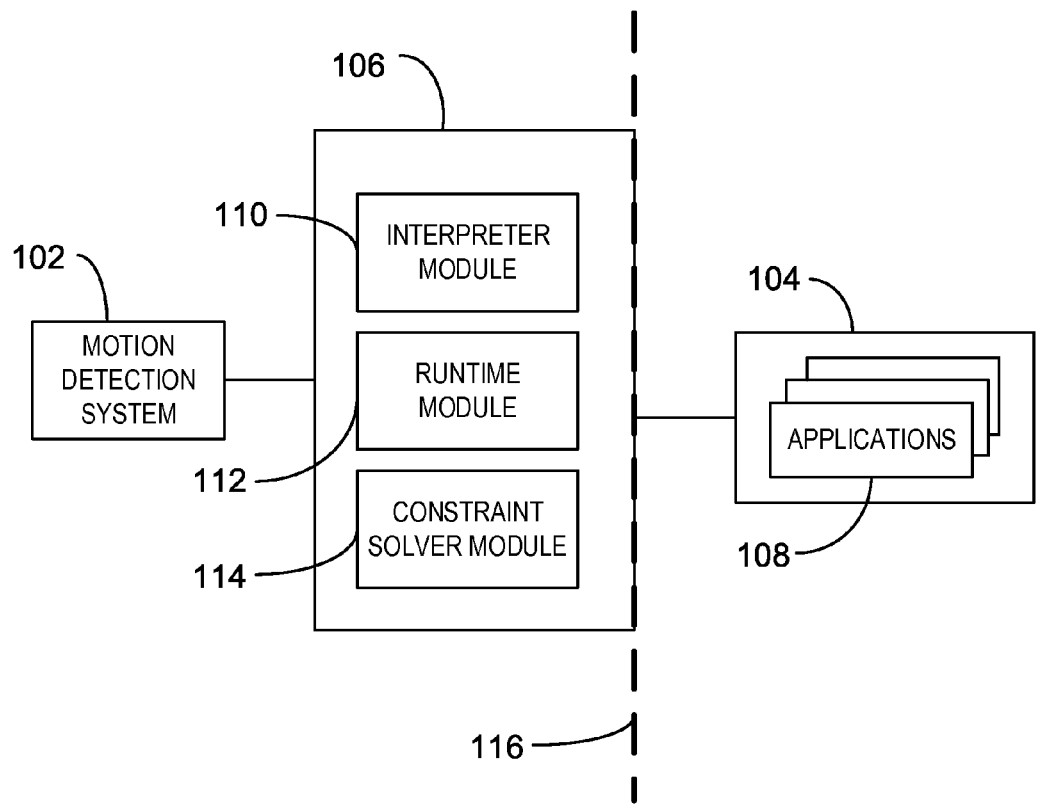
FIG. 1 is a block diagram of an example system for static analysis of gestures according to implementations described herein.

FIG. 1 is a block diagram of an example system for processing gestures according to implementations described herein. The example computer system shown in FIG. 1 includes a motion detection system 102, a client system 104, and a gesture processing system 106. The example configuration of FIG. 1 is generally referred to by the reference number 100.

The motion detection system 102 and client system 104 may be coupled to the gesture processing system 106 through any suitable type of connection. The client system 104 includes applications 108, which include gestures that are to be analyzed and processed by the gesture processing system 106. The applications 108 may be any type of applications that use gestures to receive user input. For example, the applications 108 may be video games, exercise software, or patient monitoring software, and the like. In some examples, the applications may function without any connection to a public network such as the Internet.

The client system 104 may include any suitable type of electronic device, including personal computers, laptops, smart phones, tablets, and the like. The client system 104 may have one or more applications 108 that may be written using a language domain-specific to gestures. In some embodiments, the client system 104 may run multiple applications simultaneously.

The gesture processing system 106 may include an interpreter module 110, a runtime module 112, and a constraint solver module 114. The interpreter module 110 may use gesture libraries to translate gestures into constraints based on primitives in the gestures. For example, during gesture analysis, the interpreter module 110 may translate gestures to be analyzed into constraints, as discussed at greater length in FIGS. 4 and 5. The use of primitives in applications using gestures allows gestures to be easily coded and translated into constraints.

During user operation or testing of the gesture processing system 106, the runtime 112 may receive skeletal data from a motion detection system 102 and gestures from an application 108. In some examples, the skeletal data may represent a body by vectors, with a coordinate system based on any suitable body part, such as a hand or a hip, and a world up vector. A world up vector refers to an orientation of the y axis as opposite to the direction of gravity. In some implementations, the runtime module 112 may either match the skeletal data to a gesture or return a difference between a gesture and skeletal data at a point in time. For example, the runtime module 112 may use a pose from the gesture library to compute a target skeletal pose. The runtime module 112 may then compare skeletal data at a given point in time with the target skeletal pose. In some examples, the runtime module 112 may compute the Euclidian distance between points in the target skeleton and points in the current skeletal data. If the distances between the points all fall underneath a threshold, then the runtime module 112 may detect a match between the target skeletal pose and the current skeletal data. As defined above, a gesture includes one or more poses in a given sequence. If all the poses of a given gesture are detected in the correct sequence, then the runtime module 112 may detect a gesture event. The runtime module 112 can send the resulting gesture event to an application 108 of client 104. A gesture event, as used here, refers to a detected gesture within the skeletal data. In some implementations, the runtime module 112 may monitor skeletal data for gesture events, but send differences between a current state of the skeletal data and one or more poses. For example, an exercise application may prompt a user to perform a specific pose of a gesture. The runtime module 112 may determine that the user is not performing the pose correctly via the skeletal data and send information to the application to train the user to perform the gesture correctly. For example, the runtime module 112 may send information, such as "raise left arm higher," to the application, which may then inform the user via a screen or other interface to attempt the pose again. The user may then raise a left arm higher, which may result in the runtime module 112 detecting a pose of a gesture. In some implementations, the runtime module 112 may monitor for a specific pose and/or gesture and record how many times a pose and/or gesture occurs. For example, in a nursing facility, a runtime module 112 may count how many times patients touch their backs, among other gestures. This collected information may be used to prevent or detect injuries.

The constraint solver module 114 may also prevent injuries to end users. For example, an application may include a gesture that is dangerous for a user to perform, such as a twist or bend that may result in an injury. The constraint solver module 114 may use safety constraints and analyze gestures against these safety constraints before the user is asked to perform any dangerous gestures. The runtime module 112 may then prevent such gestures from being requested from a user. Additionally, the constraint solver module 114 may analyze gestures for conflicts. For example, the skeletal data may result in an overlapping set of gestures to be detected by the runtime module 112. For example, if a first gesture contains poses A and B in that order, and a second gestures contains poses B, C, D, in that order, then the two gestures may conflict with a third gesture containing poses A, B, C, in order, and a fourth poses containing C, D, in that order. The constraint solver module 114 may detect such conflicts beforehand, and send conflicting gestures to the client, such as a computer used by a developer. A conflicting gesture, as used herein, therefore refers to two or more gestures that may be detected simultaneously from the same skeletal data. In some implementations, the constraint solver module 114 may also detect a conflict with system-reserved gestures. For example, a system-reserved gesture may be used to navigate through a gesture-based gaming system. The constraint solver module 114 may send conflicting gestures from an application to the client, so that a developer may revise a conflicting gesture accordingly. The gesture processing system 106 therefore allows developers to efficiently test newly developed gestures before testing the gestures on actual users.

A trust boundary 116, indicated by a dotted line between the gesture processing system 106 and the client 104, may protect the privacy of users. The trust boundary 116 may indicate that skeletal data from the motion detection system 102 is processed by the gesture processing system 106, but is not directly accessible by the client 104 and/or applications 108. The skeletal data is therefore safeguarded from applications that may contain security leaks or malware. Application developers may thus no longer need to perform rigorous security checks on applications for privacy purposes. Additionally, in some implementations, an application can provide access to data that was actually collected by the recognition system and the application.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the interpreter module 110, the runtime module 112, and the constraint solver module 114 can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 2:
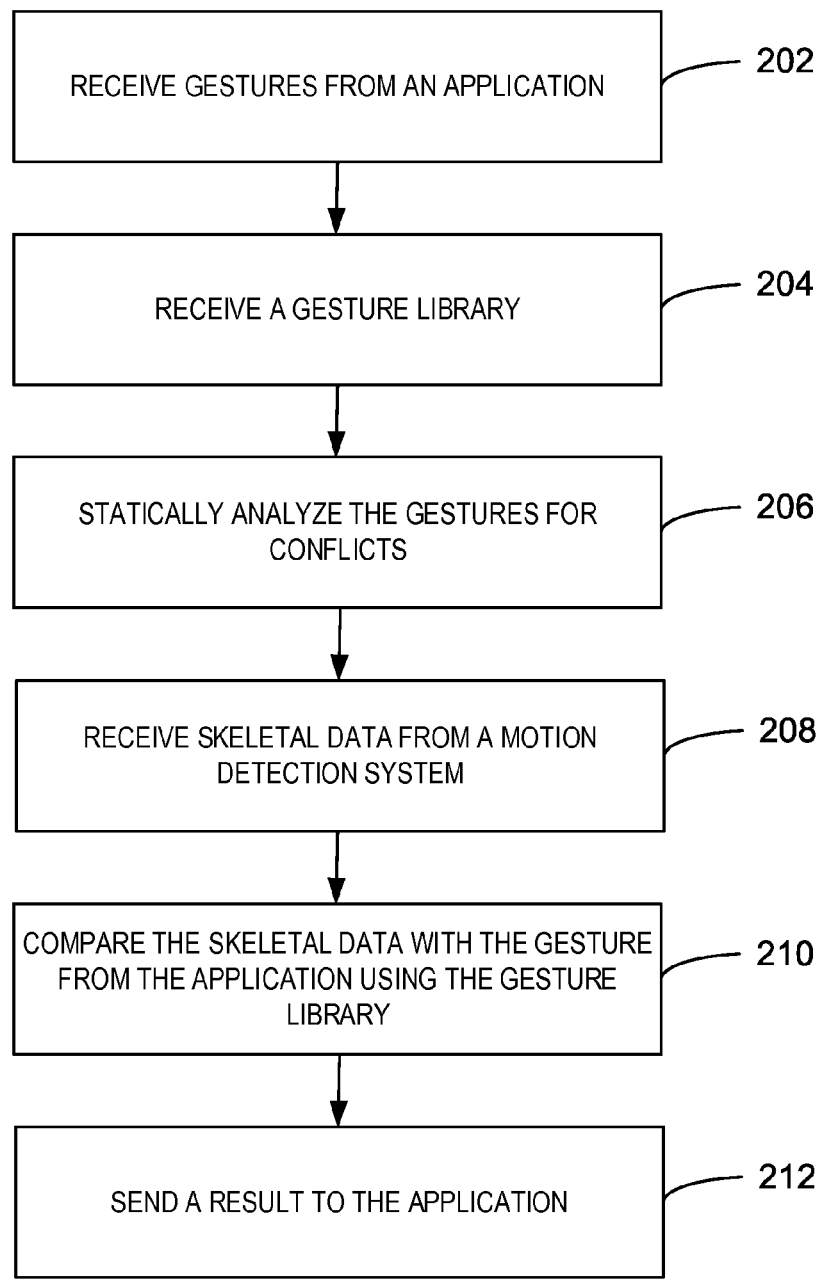
FIG. 2 is a process flow diagram summarizing a method of processing gestures according to implementations described herein.

FIG. 2 is a process flow diagram summarizing a method of processing gestures of an application according to implementations described herein. One or more components of hardware or software of the computing device 600, may be configured to perform the method 200. The method 200 may begin at block 202.

At block 202, an interpreter module 110 may receive gestures from an application. For example, the interpreter module 110 may receive a gesture that may be used to detect a movement known as "the wave." The gesture may include two or more ordered poses. For example, "the wave" gesture may include the pose "wrists down," the pose "middle," and the pose "wrists up." Each pose in a gesture may include a plurality of primitives. For example, the "wrists down" pose in "the wave" gesture may state "point your left wrist down" and "point your right wrist down." Three kinds of primitives are included in this example gesture: an action "point," the body parts "left wrist" and "right wrist" and the direction "down." In some implementations, other kinds of primitives may be used, and new kinds of primitives may also be created by a developer. For example, primitives resulting in relative constraints relating the position of one body joint to another may be used. Time constraints can also be imposed through the use of primitives indicating speed and/or velocity. The ability to create new primitives to use in gestures makes the language adaptable to many contexts. In some examples, the primitives may be used by the interpreter module 110 to translate the gestures into constraints to be used by the constraint solver module 114 in block 206 below. In addition, a gesture may have an execution block that may specify an ordered list of poses for the gesture to be detected. For example, "the wave" gestures may include the poses: "wrists down," "middle," "wrists up," "middle," and "wrists down," in that order.

At block 204, the interpreter module 110 may receive a gesture library. For example, each application may have its own gesture library that contains a list of gestures for an application, the poses and primitives of each gesture, and the definition of each primitive. For example, the direction primitive "down" in the "wrists down" pose of "the wave" gesture may be defined in the gesture library to mean "below the pelvis in a set of skeletal data." A gesture library may also contain tolerance values for detection of each primitive as well as definitions of each primitive. For example, a tolerance of 5% may be used to allow a range of positions to be detected as a specific pose. The interpreter module 110 may use the gesture library in translating the gestures into constraints to be used by the constraint solver module 114. For example, in the "wrists down" pose, "point your left wrist down" may be a function of a user's original skeletal position. The input to the function may be the original skeleton in the skeletal data. The output of the function may be a constraint on the skeletal data such that the "left wrist" joint is moved to be "down" as defined in the gesture library.

At block 206, the constraint solver module 114 may statically analyze the gestures for conflicts. As described above, static analysis refers to analyzing the gestures before an application is executed. The constraint solver module 114 may analyze the gestures for different kinds of conflicts, as discussed in detail in FIGS. 3-5. Because the analysis is performed before the application is executed, integrity of the program and user safety may be ensured before any conflicts or injuries actually occur.

At block 208, the runtime module 112 may receive skeletal data from a motion detection system. For example, the skeletal data may include information such as skeletal joint position and movement. Such in information may include skeleton points with 3-D coordinates such as "Head (10,10,10)" or "Neck(10,5,10)," raw depth frames indicating how far away each individual object in the sensor's field of view is from the lens, and/or a color picture. In some implementations, an application may send a privacy notice to a user explaining what data is collected and how the data is safeguarded. For example, a privacy notice may explain that skeletal data is collected by the motion detection system but that specific detected gesture events are available to the applications for application functionality. In some implementations, an opt-out option may be provided for users that do not agree to the terms. For example, if a user does not agree with the data being collected, then the application will be prevented from being executed. In some implementations, the privacy notice may include an application-eye-view showing what the application may see if the user agrees. For example, a pre-recorded video visualizing what the application sees may be displayed on a display. The notice may then have a button asking the user to opt-in and/or opt-out.

At block 210, the runtime module 112 may compare the skeletal data with the gesture from the application using the gesture library. The gesture library may be used for, among other things, tolerance thresholds and the conversion of primitives into constraints. For example, the skeletal data may include a set of poses in a specific order that correspond to a gesture received from the application. In some examples, the constraint solver module 114 may calculate a target skeletal position or target pose from the primitives of a pose. To match a pose, the runtime module 112 may register a callback on the skeletal data tracking frames. The callback may be called every time a new skeleton frame arrives. In some examples, the runtime module 112 may, for every frame and every joint in the skeleton, compute the distance between the joint's current position and the target position. If the joint distance is below a threshold, the joint matches. If all joints match, then the poses matches. Thus, the runtime module 112 may detect that a pose of a gesture is within a threshold value of a target pose. In some examples, the constraint solver 114 may then calculate a new target pose based upon constraints specified by the function defining the next pose of a gesture to be detected. If all poses of a gesture are detected in the order of the execution block, then the runtime detects and records a gesture event. The runtime module 112 may record a gesture event each time the gesture is detected in the skeletal data.

At block 212, the runtime module 112 may send a result to the application. In some examples, the result may be a gesture event. In some examples, the result may be a difference between a gesture that is being monitored and received skeletal data. For example, the difference may be that a right hand is not raised in the skeletal data. The runtime module 112 may send the difference result to the application.

This process flow diagram is not intended to indicate that the blocks of the method 200 are to be executed in any particular order, or that all of the blocks are to be included in every case. Further, any number of additional blocks not shown may be included within the method 200, depending on the details of the specific implementation.

Figure 3:
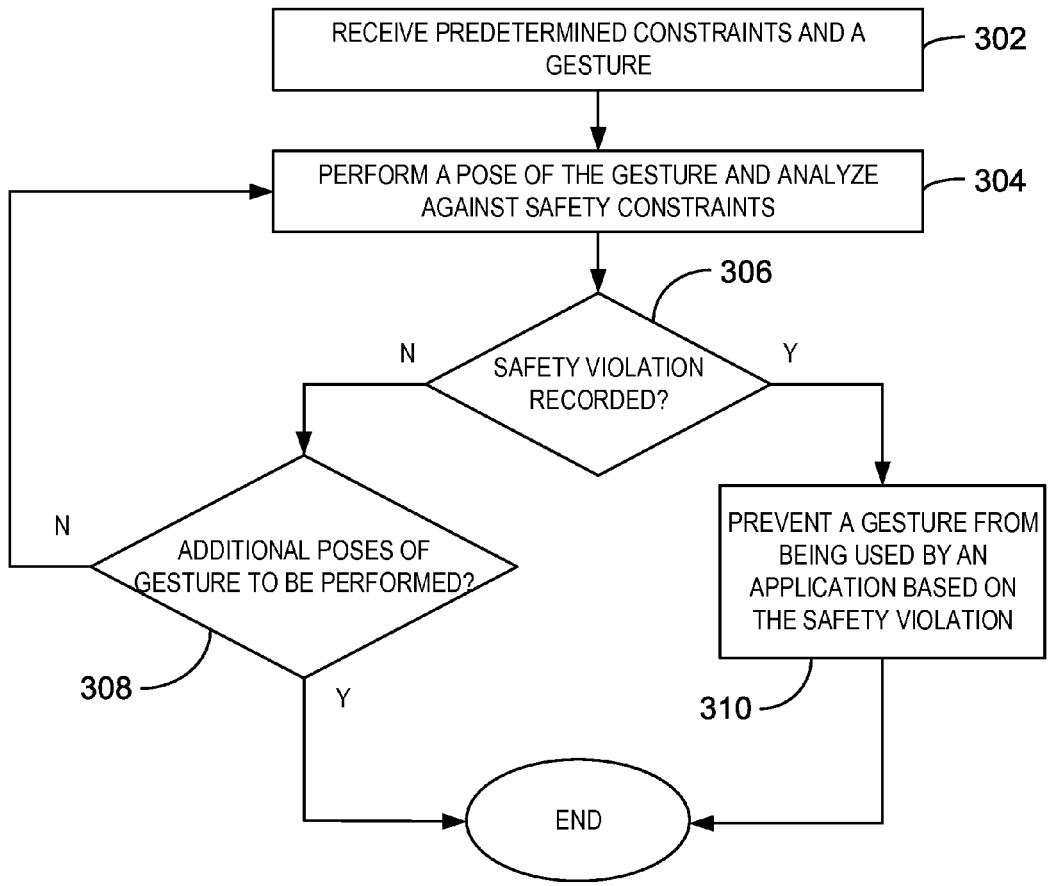
FIG. 3 is a process flow diagram summarizing a method of statically determining unsafe gestures according to implementations described herein.

FIG. 3 is a process flow diagram summarizing a method of analyzing a gesture for safety violations according to implementations described herein. One or more components of hardware or software of the computing device 600, may be configured to perform the method 300. The method 300 may begin at block 302.

At block 302, the runtime module 112 may receive predetermined constraints and a gesture. For example, the predetermined constraints may be a list of dangerous gestures and/or conditions that would be dangerous for a user. For example, a gesture that would hyperextend an elbow, twist or bend a spine beyond a threshold, or cause a limb to move outside a range of natural motion may be considered dangerous gestures, among others. In some examples, the predetermined constraints may be provided by a developer or shared among developers for user safety. For example, the predetermined constraints may be spine constraints, elbow constraints, shoulder constrainers, or time constraints, and the like. In some embodiments, the predetermined constraints may limit the range of motion of gestures. For example, a predetermined constraint may limit the rotation of an arm to a degree below a threshold, or may limit the distance a gesture requests a limb to move in relation to a torso, among others. In some examples, the constraints may take the form of formulas that name (x,y,z) coordinates that are allowed for specific body joints. For example, a constraint might limit that the y coordinate of the left wrist joint to zero.

At block 304, the constraint solver module 114 may perform a pose of the gesture and the constraint solver module 114 may analyze the gesture against the predetermined constraints. For example, the constraint solver 114 may solve for a new skeleton position given the constraints added by the functions in a pose. In some implementations, the gesture is initially labeled safe by the runtime module 112 and the constraint solver module 114 performs the first pose of the gesture. For example, a gesture may include two poses to be executed sequentially. The first and second poses may include the instructions: "point your arms down" and "put your left ankle above your head." A safety constraint may prohibit the placement of an ankle above a head while standing for safety reasons. In some examples, the constraint solver module 114 may determine that a gesture falls within the bounds of the predetermined constraint and is thus a safety violation. The runtime module 112 may record a safety violation and send the details of the safety violation to client 104. For example, the instruction "put your left ankle above your head" of the first pose violates a specific constraint against placement of an ankle above a head while standing.

At diamond 306, the constraint solver module 114 may determine if a safety violation has been recorded. If no safety violation has been recorded, then the method proceeds to diamond 308. If a safety violation was recorded, then the method may proceed to block 310.

At block 308, the runtime module 112 may determine if additional poses within the gesture are to be performed. If so, the runtime module 112 may receive the next pose of the gesture. The runtime module 112 may then execute the next pose of the gesture at block 304 and the constraint solver module 114 may again determine whether the gesture is still safe as in diamond 306. The runtime module 112 may proceed through all the poses of the gesture until a safety violation is detected or the poses of the gesture have been performed.

At block 310, the runtime module 112 may prevent a gesture from being used by an application based on the safety violation. In some implementations, the runtime module 112 may send the unsafe gesture with details about the safety violation to the client 104. The gesture may then be changed or replaced with another safe gesture in the application.

This process flow diagram is not intended to indicate that the blocks of the method 300 are to be executed in any particular order, or that all of the blocks are to be included in every case. Further, any number of additional blocks not shown may be included within the method 300, depending on the details of the specific implementation.

Figure 4:
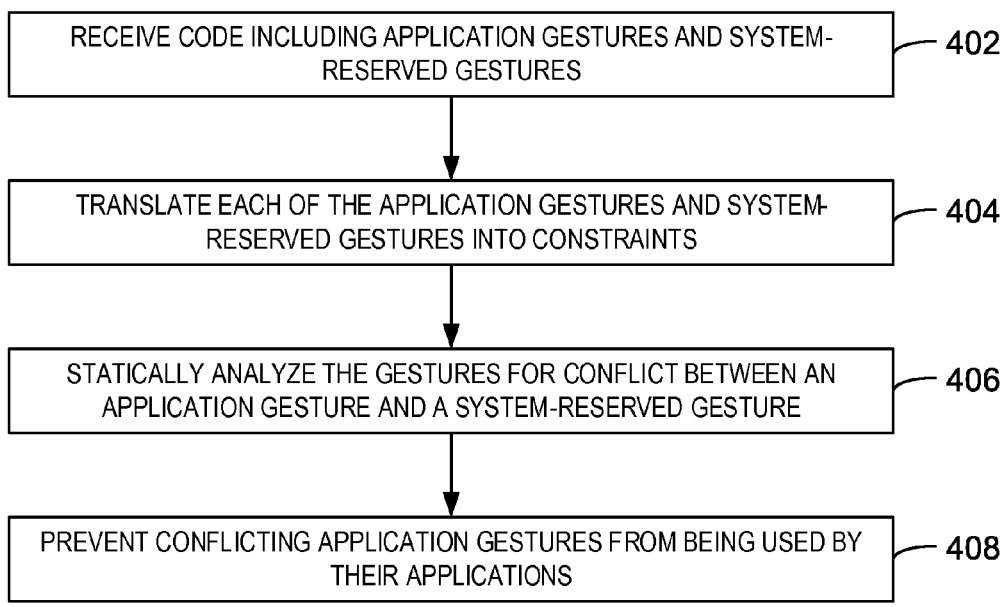
FIG. 4 is a process flow diagram summarizing a method of statically determining whether a gesture conflicts with a system-reserved gesture according to implementations described herein.

FIG. 4 is a process flow diagram summarizing a method of statically determining whether a gesture conflicts with a system-reserved gesture according to implementations described herein. One or more components of hardware or software of the computing device 600, may be configured to perform the method 400. The method 400 may be performed by the gesture processing system and may begin at block 402.

At block 402, the interpreter module 110 may receive code including application gestures and system-reserved gestures. In some embodiments, the interpreter module 110 may receive code from any suitable application and the code may include any number and type of gestures. For example, the code may include application gestures and system-reserved gestures. As discussed above, an application gesture includes two or more ordered poses used to perform an application action and a system-reserved gesture includes two or more poses used to perform a system action.

At block 404, the interpreter module 110 may translate each of the application gestures and system-reserved gestures into constraints. For example, the application gestures may be gestures provided by an application as described above. System-reserved gestures may be gestures that have been reserved for use by the motion detection system for interaction with the system. For example, a system-reserved gesture may be used to turn the system off, to exit an application, or browse through applications, and the like. In some implementations, an interpreter module 110 may translate both the application gestures and the system-reserved gestures into constraints for the constraint solver module 114 to statically analyze. For example, the specific constraints take the form of formulas which name (x,y,z) coordinates that are allowed for specific body joints.

At block 406, the constraint solver module 114 may statically analyze the gestures for conflict between an application gesture and a system-reserved gesture. As described above, static analysis refers to analyzing the gestures before an application is executed. The constraint solver module 114 may use the constraints provided by the interpreter module 110 to determine whether any conflicts exist between an application gesture and a system-reserved gesture. For example, one or more application gestures may overlap with a system-reserved gesture such that both would be detected by the runtime module 112 if the application was running. The constraint solver module 114 may determine that the ordered poses of a system-reserved gesture may be present in an application gesture, or that such ordered poses may also be detected while performing the ordered poses of two or more application gestures. The constraint solver module 114 may send such conflicts to the client 104, with details about the conflicting poses or movements. A developer may then edit the conflicting application gestures accordingly.

At block 408, the runtime module 112 may prevent conflicting application gestures from being used by corresponding applications. In some implementations, the runtime module 112 may receive a system-reserved gesture conflict from the constraint solver module 114 and change the conflicting application gesture with another available gesture from the gesture library. For example, a first gesture that involves moving a right hand from right to left, may be replaced with a second gesture that involves moving a right hand from left to right, if the first gesture has already been reserved by the system for resetting the system, for example.

This process flow diagram is not intended to indicate that the blocks of the method 400 are to be executed in any particular order, or that all of the blocks are to be included in every case. Further, any number of additional blocks not shown may be included within the method 400, depending on the details of the specific implementation.

Figure 5:
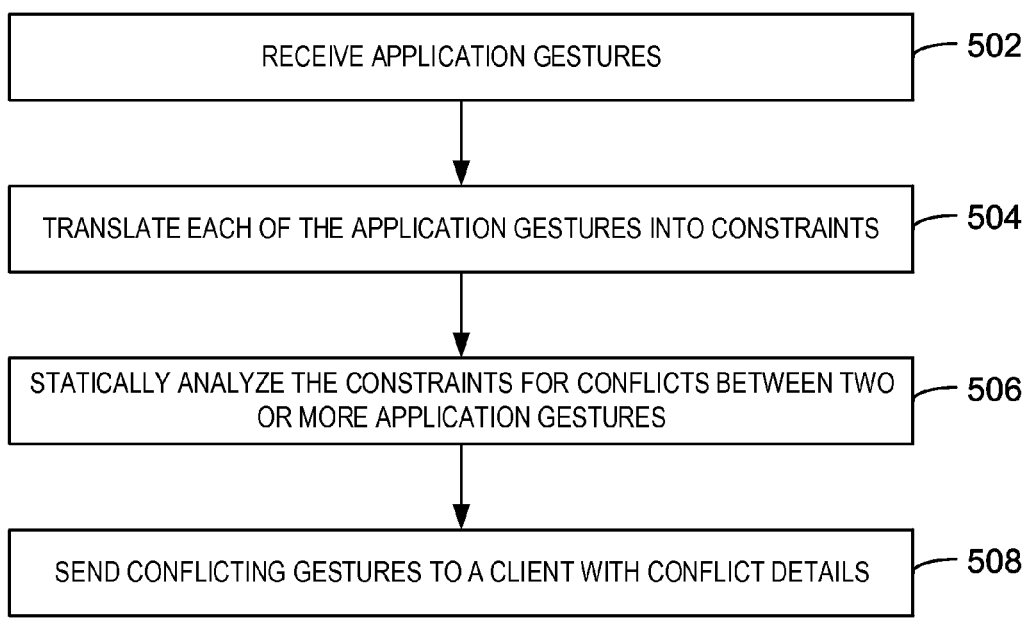
FIG. 5 is a process flow diagram summarizing a method of statically determining conflicting gestures according to implementations described herein.

FIG. 5 is a process flow diagram summarizing another method of statically determining conflicting gestures according to implementations described herein. One or more components of hardware or software of the computing device 600, may be configured to perform the method 500. The method 500 may be performed by the gesture processing system and may begin at block 502.

At block 502, the interpreter module 110 may receive application gestures. For example, the application gestures may be provided by one or more applications as described above. In some examples, the gestures may be provided from the application in the form of a gesture library.

At block 504, the interpreter module 110 may translate each of the application gestures into constraints. As described above, the interpreter module 110 may translate the application gestures into constraints for the constraint solver module 114 to statically analyze. Each function of a pose in a gesture may be translated into formulas that may name coordinates that are allowed for specific body joints.

At block 506, the constraint solver module 114 may statically analyze the constraints for conflicts between two or more application gestures. For example, two or more gestures provided by an application may be detected from the same skeletal data. The skeletal data may include, for example, data corresponding to user movements over any suitable amount of time. In some examples, a combination of two or more application gestures may conflict with another combination of two or more application gestures, as discussed above with reference to FIG. 1. The constraint solver module 114 may also analyze the application gestures for conflicts between combinations of gestures.

At block 508, the constraint solver module 114 may send conflicting gestures to a client 104 with conflict details. For example, the client 104 may be a computer being used by an application developer. The constraint solver module 114 may include details about the conflict, such as the gesture or combinations of gestures that resulted in the conflict, and the specific primitives causing the conflict. For example, the conflict may include two or more poses that are ordered in the same way in two or more gestures.

This process flow diagram is not intended to indicate that the blocks of the method 500 are to be executed in any particular order, or that all of the blocks are to be included in every case. Further, any number of additional blocks not shown may be included within the method 500, depending on the details of the specific implementation.

FIG. 6 is intended to provide a brief, general description of a computing architecture in which the various techniques described herein may be implemented. For example, the methods 200, 300, 400 and 500 and system 100 for processing gestures may be implemented in such a computing environment. While the claimed subject matter has been described above in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 6 is a block diagram of an exemplary computing device configured for implementing various aspects of the techniques described herein. The computing device 600 is an example of a computing device that may be used to implement any of the techniques described above. For example, the exemplary computing device 600 may be a gaming system, a computer system, or a training system, among others. The exemplary computing device 600 includes a computer 602. The computer 602 includes a processing unit 604, a system memory 606, and a system bus 608.

The system bus 608 couples system components including, but not limited to, the system memory 606 to the processing unit 604. The processing unit 604 may be any of various available processors. Dual microprocessors and other multiprocessor architectures also may be employed as the processing unit 604.

The system bus 608 may be any of several types of bus structure, including the memory bus or memory controller, a peripheral bus or external bus, and a local bus using any variety of available bus architectures known to those of ordinary skill in the art. The system memory 606 includes computer-readable storage device that includes volatile memory 610 and nonvolatile memory 612.

The basic input/output system (BIOS), containing the basic routines to transfer information between elements within the computer 602, such as during start-up, is stored in nonvolatile memory 612. By way of illustration, and not limitation, nonvolatile memory 612 may include read only memory (ROM), programmable ROM (PROM), electrically programmable ROM (EPROM), electrically erasable programmable ROM (EEPROM), or flash memory.

Volatile memory 610 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 602 also includes other computer-readable media, such as removable/non-removable, volatile/nonvolatile computer storage device. FIG. 6 shows, for example a disk storage 614. Disk storage 614 includes, but is not limited to, devices like a magnetic disk drive, floppy disk drive, tape drive, Jaz drive, Zip drive, LS-210 drive, flash memory card, or memory stick.

In addition, disk storage 614 may include storage devices separately or in combination with other storage devices including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 614 to the system bus 608, a removable or non-removable interface is typically used such as interface 616.

It is to be appreciated that FIG. 6 describes software that acts as an intermediary between users and the basic computer resources described in the suitable computing device 600. Such software includes an operating system 618. Operating system 618, which may be stored on disk storage 614, acts to control and allocate resources of the computer system 602.

System applications 620 take advantage of the management of resources by operating system 618 through program modules 622 and program data 630 stored either in system memory 606 or on disk storage 614. It is to be appreciated that the claimed subject matter may be implemented with various operating systems or combinations of operating systems.

Modules 622 can include an interpreter module 624, a runtime module 626 and a constraint solver module 628. In some implementations, the interpreter module 624 can include code to receive a gesture from an application. For example, the gesture can include one or more poses containing primitives from a language that is domain-specific to gestures. In some implementations, the runtime module 626 can include code to receive skeletal data from a motion detector system. For example, the skeletal data can include position, movement, and rotation about skeletal joints, including those of the hands, and facial features, among other data. In some implementations, the constraint solver module 628 may statically analyze the application for a conflict. For example, the conflict may include a conflict between gestures, a conflict between a gesture and system-reserved gesture, and/or a safety conflict.

A user enters commands or information into the computer 602 through input devices 632. Input devices 632 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 632 connect to the processing unit 604 through the system bus 608 via interface ports 634. Interface ports 634 include, for example, a serial port, a parallel port, a game port, and a universal serial bus (USB).

Output devices 636 use some of the same type of ports as input devices 632. Thus, for example, a USB port may be used to provide input to the computer 602, and to output information from computer 602 to an output device 636.

Output adapter 638 is provided to illustrate that there are some output devices 630 like monitors, speakers, and printers, among other output devices 636, which are accessible via adapters. The output adapters 638 include, by way of illustration and not limitation, video and sound cards that provide a means of connection between the output device 636 and the system bus 608. It can be noted that other devices and systems of devices provide both input and output capabilities such as remote computers 640.

The computer 602 may be a server hosting various software applications in a networked environment using logical connections to one or more remote computers, such as remote computers 640. The remote computers 640 may be client systems configured with web browsers, PC applications, mobile phone applications, and the like.

The remote computer 640 may be a personal computer, a server, a router, a network PC, a workstation, a microprocessor based appliance, a mobile phone, a peer device or other common network node and the like, and typically includes many or all of the elements described relative to the computer 602.

For purposes of brevity, a memory storage device 606 is illustrated with remote computers 640. Remote computers 640 are logically connected to the computer 602 through a network interface 642 and then connected via a wireless communication connection 644.

Network interface 636 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connections 638 refers to the hardware/software employed to connect the network interface 636 to the bus 608. While communication connection 640 is shown for illustrative clarity inside computer 602, the communication connection 640 may also be external to the computer 602. The hardware/software for connection to the network interface 638 may include, for exemplary purposes, internal and external technologies such as, mobile phone switches, modems including regular telephone grade modems, cable modems and DSL modems, ISDN adapters, and Ethernet cards.

Figure 7:
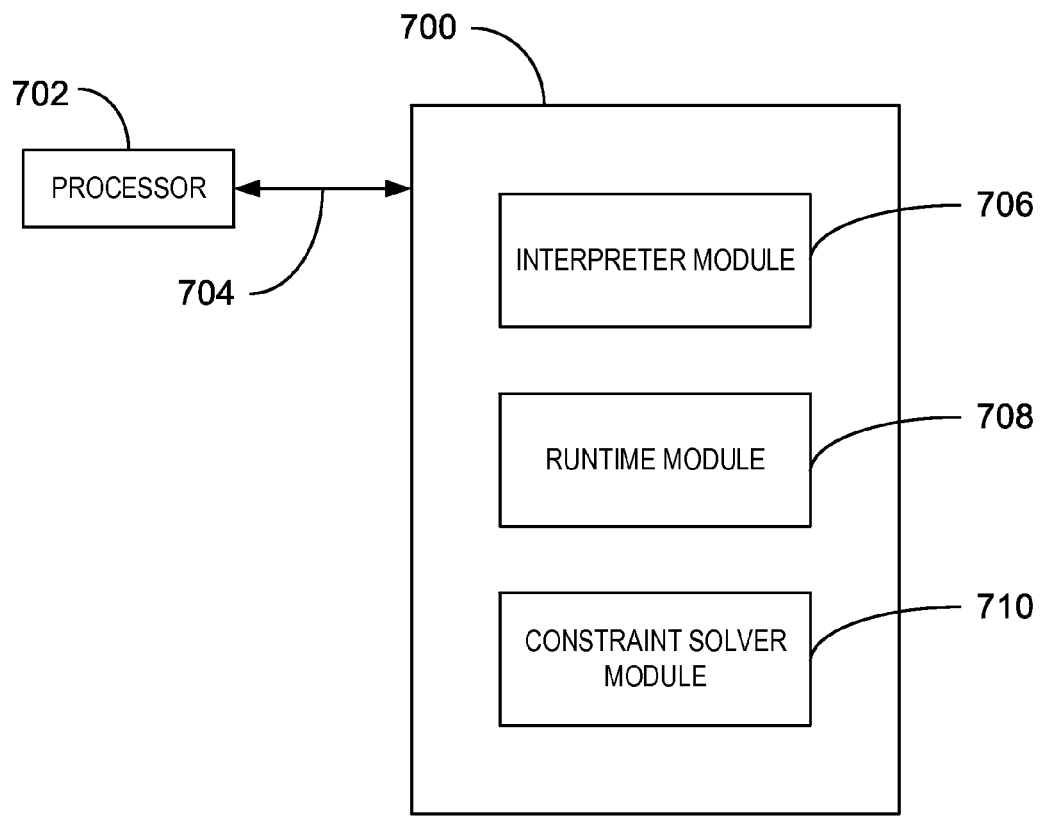
FIG. 7 is a block diagram of an exemplary computer-readable storage medium that can be used to process gestures.

FIG. 7 is a block diagram showing a tangible, computer-readable storage medium that can be used to process gestures. The tangible, computer-readable storage device 700 can be accessed by a processor 702 over a computer bus 704. Furthermore, the tangible, computer-readable storage device 700 can include code to direct the processor 702 to perform the current methods. For example, methods 200-500 can be performed by the processor 702.

The various software components discussed herein can be stored on the tangible, computer-readable storage device 700, as indicated in FIG. 7. For example, the tangible computer-readable storage device 700 can include an interpreter module 706, a runtime module 708, and a constraint solver module 710. In some implementations, the interpreter module 706 can include code to receive a gesture from an application. For example, the gesture can include one or more poses containing primitives from a language that is domain-specific to gestures. The interpreter module 706 can also include code to receive a gesture library. For example, the gesture library can include primitives from the language that is domain-specific to gestures.

In some implementations, the runtime module 708 can include code to receive skeletal data from a motion detector system. For example, the skeletal data can include position, movement, and rotation about skeletal joints, including those of the hands, and facial features, among other data. In some examples, the runtime module 708 can compare the skeletal data with the gesture from the application using the gesture library. For example, the gesture library may be used by the interpreter module 706 to translate gestures into intermediate representations that can be used by the runtime module 708 to compare with the skeletal data. For example, the intermediate representations may include constraints. The primitives of a gesture may correspond to the constraints, such as a time constraint or a relative constraint. For example, a time constraint may indicate a speed or velocity for a pose from a previous pose. A relative constraint may indicate a position or movement of at least two body joints in the skeletal data relative to each other. In some examples, multiple gestures may be compared against the skeletal data simultaneously and multiple applications may be running on the processor 702. In some implementations, the runtime module 708 may return a result to the application. For example, the result can include primitives describing a difference between the skeletal data and the gestures. In some examples, the result may be a gesture event based on whether the difference between the skeletal data and each primitive is below a threshold tolerance.

In some implementations, the constraint solver module 710 may statically analyze the application for a conflict. For example, the conflict may include a conflict between gestures, a conflict between a gesture and system-reserved gesture, and/or a safety conflict.

It is to be understood that any number of additional software components not shown in FIG. 7 can be included within the tangible, computer-readable storage device 700, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Example 1

An example of a system for static analysis of gestures is provided. The example system can include a first module configured to receive a plurality of gestures and translate each of the gestures into an intermediate representation. Each gesture can include one or more primitives from a language domain-specific to gestures. The example system can also include a second module configured to statically analyze the intermediate representation for a condition.

In some implementations, the second module can further receive a predetermined constraint. The condition can include a safety violation based on the predetermined constraint. Alternatively, or in addition, the condition can include a conflict between two or more of the gestures. Alternatively, or in addition, the second module can further receive a system-reserved gesture. The system-reserved gesture can include a gesture reserved for communication with a gesture recognition system and the condition comprising a conflict of a gesture with a system-reserved gesture. Alternatively, or in addition, the first module can be an interpreter module. Alternatively, or in addition, the second module can be a constraint solver module. The constraint solver module can receive constraints and can determine whether the intermediate representation is outside the constraints. Alternatively, or in addition, a gesture can include a function and one or more arguments. The function can indicate an action and the one or more arguments can indicate a direction, angle of movement relative to a joint, and/or a segment of a skeleton.

Example 2

An example of a method for processing gestures is provided. The example method can include receiving a gesture from an application, the gesture comprising one or more primitives from a language that is domain-specific to gestures. The example method also can include receiving skeletal data from a motion detection system. The example method can include comparing the skeletal data with the gesture from the application in a runtime module. The example method can further include sending a gesture event to the application.

In some implementations, the example method can include monitoring for the gesture and returning a difference to the application. The difference can include primitives describing a difference between the skeletal data and the gesture. Alternatively, or in addition, the gesture event is based on whether the difference between the skeletal data and each primitive is below a threshold tolerance. Alternatively, or in addition, at least one primitive can correspond to a time constraint. Alternatively, or in addition, at least one primitive in the gestures can correspond to a relative constraint. The relative constraint can indicate a position or movement of at least two points in the skeletal data relative to each other. Alternatively, or in addition, the example method can include deleting the skeletal data after returning a gesture event to the application. Alternatively, or in addition, the example method can include statically analyzing the application for a conflict. The conflict can include a conflict between gestures, a conflict between a gesture and system-reserved gesture, and/or a safety conflict.

Example 3

An example of one or more computer-readable memory storage device for processing gestures. The example one or more computer-readable memory storage device can include instructions, that, when executed by a processor, can cause the processor to receive a gesture from an application. The gesture can include one or more primitives from a language that is domain-specific to gestures. When executed, the example computer-readable instructions can cause the processor to receive a gesture library. The gesture library can include primitives from the language that is domain-specific to gestures. When executed, the example computer-readable instructions can also cause the processor to receive skeletal data from a motion detection system. When executed, the example computer-readable instructions can also cause the processor to compare the skeletal data with the gesture from the application in a runtime module using the gesture library. When executed, the example computer-readable instructions can also further cause the processor to send a result to the application.

In some implementations, the example computer-readable instructions that instruct the one or more processing devices to the result can include primitives describing a difference between the skeletal data and the gesture. Alternatively, or in addition, the result can include a gesture event based on whether the difference between the skeletal data and each primitive is below a threshold tolerance. Alternatively, or in addition, at least one primitive can correspond to a time constraint. Alternatively, or in addition, at least one primitive in the gestures can correspond to a relative constraint. The relative constraint can indicate a position or movement of at least two points in the skeletal data relative to each other. Alternatively, or in addition, when executed, the example computer-readable instructions can also cause the processor to further statically analyze the application for a conflict. The conflict can include a conflict between gestures, a conflict between a gesture and system-reserved gesture, and/or a safety conflict.

Example 4

An example of a system is provided. The example system can include a means to receive a plurality of gestures and translate each of the gestures into an intermediate representation. Each gesture can include one or more primitives from a language domain-specific to gestures. The example system can also include a means to statically analyze the intermediate representation for a condition.

In some implementations, the example system can include a means to further receive a predetermined constraint. Alternatively, or in addition, the condition can include a safety violation based on the predetermined constraint. Alternatively, or in addition, the condition can include a conflict between two or more of the gestures. Alternatively, or in addition, the example system can include a means to further receive a system-reserved gesture. The system-reserved gesture can include a gesture reserved for communication with a gesture recognition system and the condition comprising a conflict of a gesture with a system-reserved gesture. Alternatively, or in addition, the means to receive a plurality of gestures and translate each of the gestures into an intermediate representation can be an interpreter module. Alternatively, or in addition, the means to statically analyze the intermediate representation for a condition can be a constraint solver module. The constraint solver module can receive constraints and can determine whether the intermediate representation is outside the constraints. Alternatively, or in addition, a gesture can include a function and one or more arguments. The function can indicate an action and the one or more arguments can indicate a direction, angle of movement relative to a joint, and/or a segment of a skeleton.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage device having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components may include those components or specified sub-components, some of the specified components or sub-components, and additional components, and according to various permutations and combinations of the foregoing. Sub-components may also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for static analysis of gestures, comprising a processor to:

receive a plurality of gestures comprising one or more primitives from a language domain-specific to gestures specifying an ordering of poses to be performed for each gesture, and translate each of the gestures into a relative constraint that represents an allowable coordinate for a specific body joint; and statically analyze the constraint for a conflict.

2. A method for processing gestures, comprising:

receiving, via a processor, a gesture from an application, the gesture comprising one or more primitives from a language that is domain-specific to gestures specifying an ordering of poses to be performed for each gesture;

translating, via the processor, the gesture into a relative constraint that represents an allowable coordinate for a specific body joint;

statically analyzing, via the processor, the application for a conflict based on the relative constraint.

3. One or more computer-readable storage device for processing gestures, comprising a plurality of instructions that, when executed by a processor, cause the processor to:

receive a gesture from an application, the gesture comprising one or more primitives from a language that is domain-specific to gestures specifying an ordering of poses to be performed for each gesture;

receive a gesture library, the gesture library comprising primitives from the language that is domain-specific to gestures;

translate the gesture into a relative constraint that represents an allowable coordinate for a specific body joint; and statically analyze the application for at least one conflict based on the relative constraint.

4. The system of claim 1, wherein the processor is to also translate the gesture into a time constraint.

5. The system of claim 1, comprising a motion detector and an application, wherein the processor is to receive skeletal data from the motion detector, wherein the processor is to return a result based on the skeletal data to the application without sending the skeletal data to the application.

6. The system of claim 5, wherein the skeletal data comprises a position, a movement, a rotation about skeletal joints, or any combination thereof.

7. The system of claim 5, wherein the application is to a display a privacy notice that explains that skeletal data is collected by the motion detection system but that specific detected gesture events are available to the applications for application functionality.

8. The system of claim 7, wherein the privacy notice comprises an application-eye-view that displays information that the application is to access if the user agrees.

9. The system of claim 5, comprising a trust boundary to prevent the processor from sending the skeletal data to the application.

10. The system of claim 4, wherein the time constraint indicates a speed or velocity for a pose from a previous pose.

11. The method of claim 2, comprising translating, via the processor, the gesture into a time constraint.

12. The method of claim 2, comprising receiving skeletal data, via a motion detector, and returning, via the processor, a result based on the skeletal data to an application without sending the skeletal data to the application.

13. The method of claim 12, wherein the skeletal data comprises a position, a movement, a rotation about skeletal joints, or any combination thereof.

14. The method of claim 12, comprising displaying, via the application, a privacy notice that explains that skeletal data is collected by the motion detection system but that specific detected gesture events are available to the applications for application functionality.

15. The method of claim 14, wherein the privacy notice comprises an application-eye-view that displays information that the application is to access if the user agrees.

16. The method of claim 12, comprising preventing, via a trust boundary, the processor from sending the skeletal data to the application.

17. The method of claim 11, wherein the time constraint indicates a speed or velocity for a pose from a previous pose.

18. The one or more computer-readable storage device of claim 3, comprising instructions that cause the processor to translate the gesture into a time constraint.

19. The one or more computer-readable storage device of claim 3, comprising instructions that cause the processor to receive skeletal data from a motion detect and return a result based on the skeletal data to an application without sending the skeletal data to the application.

20. The one or more computer-readable storage device of claim 19, comprising instructions that cause the processor to display a privacy notice that explains that skeletal data is collected by the motion detection system but that specific detected gesture events are available to the applications for application functionality.

21. The one or more computer-readable storage device of claim 19, wherein the privacy notice comprises an application-eye-view that displays information that the application is to access if the user agrees.

22. The one or more computer-readable storage device of claim 19, comprising instructions that cause the processor to avoid sending the skeletal data to the application.

23. The one or more computer-readable storage device of claim 18, wherein the time constraint indicates a speed or velocity for a pose from a previous pose.

* * * * *